Patented Apr. 23, 1940

2,198,215

UNITED STATES PATENT OFFICE 2,198,215

STABILIZATION OF GLYCERIDE OILS

Sidney Musher, New York, N. Y., assignor to Musher Foundation Incorporated, New York, N. Y., a corporation of New York No Drawing. Application November 7, 1938, Serial No. 239,319

9 Claims. (Cl. 23—250)

This invention relates to the stabilization of glyceride oils which are subject to oxidative deterioration.

An object of this invention is the stabilization of organic materials in simple, inexpensive and effective manners and by readily available compositions.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, relatively small quantities of organic nitrogen and water soluble carbohydrate containing milk solids, and preferably milk solids substantially free of fat and in concentrated or dried form are heated to high temperatures in the oxidizable oil or oil containing composition.

Among the milk-solids-not-fat, sometimes referred to as serum solids, are included any of the following materials or materials derived from them: skim milk, buttermilk, whey, partially skim milk, whole milk, cream, casein products, acidulated milk products, etc. These materials should preferably be used in dehydrated or dried form such as when spray or drum dried, used in flaked form, etc., for their full effectiveness is only exerted when heated to very high temperatures and under such circumstances the presence of water would be undesirable. They may also however be employed in concentrated or plastic condition and particularly when a substantial amount of the water normally present is removed as by evaporating, drying, or other processing.

Example I 0.5% of powdered skim milk was added to refined cottonseed oil at the close of the deodorizing operation and while the oil was still at about 400° F. The milk charred in the oil at that temperature, and the oil was then filtered to remove the undissolved matter. The oil was compared with oil made without the milk treatment, tests being conducted at 98° F. exposing 50 cc. quantities of the oil to air.

Rancid after—
Treated oil _____ 21 days
Untreated oil _____ 3 days

The heat treatment is essential to produce the desired stabilizing action and it is furthermore desirable for the heating to be conducted in the presence of the oil requiring stabilization. A heat treatment of between 325° F. and 450° F. or higher for relatively short periods such as from a flash heat to 10 minutes is preferred although when the oil is being used or processed at the elevated temperature for long periods, the milk solids may be kept in contact with the oil to stabilize it during that processing period or period of use.

A desirable average temperature for heating is 400° F. but this may be modified to suit special circumstances. It is, however, important for the heating to be conducted in excess of 250° F. and far more preferable in excess of 325° F. where the heat would be sufficient to char or burn the milk solids in the oil, thereby producing the necessary interaction.

Example II

Refined deodorized peanut oil was

A. Treated with 0.1% of powdered skim milk as commonly used for animal consumption, mixed thoroughly, and tested at 98° F.

B. Treated with 0.1% of the powdered skim milk as above, mixed, heated to 375° F. for 1 minute, cooled and tested at 98° F.

Rancid after—
Peanut oil A _____ 4 days
Peanut oil B _____ 16 days

Although it is desirable for the insoluble and usually charred material to be filtered from the oil following treatment, it is not necessary.

The milk solids not fat may be used in any normal small quantities such as from 0.01% to 3.0% against the weight of the oil. Since the interaction which occurs is believed to be not in the nature of negative catalysis but rather a chemical interaction, the use of excess quantities are not desirable not only because they are proportionately relatively ineffective, but because they build up undesired charred material, discolor the oil, are difficult to handle, and render the process more costly.

Moreover, although a concentrate of the milk solids heated in a small quantity of oil may be prepared for addition to a larger quantity of oil, and although this procedure will produce somewhat beneficial results, the results are not nearly so striking as when a small quantity of the milk solids not fat in dry form are heated in the entire body of oxidizable oil.

Example III

Cod liver oil samples were prepared with

A. 1% of powdered buttermilk, heated to 400° F., and immediately cooled.

B. 5% of a mixture comprising 80% cod liver oil and 20% powdered buttermilk which mixture was heated to 400° F. and then immediately cooled.

C. Untreated cod liver oil.

|  | Rancid after (at 98° F.)— |
|---|---|
| Cod liver oil A | 120 hours |
| Cod liver oil B | 26 hours |
| Cod liver oil C | 15 hours |

The heating may be conducted in air, at atmospheric or subatmospheric pressure, or in inert gas or steam media. This process is particularly valuable where the oils are normally processed or used at high temperatures in air under which deteriorating influences the milk solids stabilize the oil.

Among the different oils that may be treated in accordance with this invention are the glyceride oils, such as the animal and vegetable oils and fats, including linseed, soya, cottonseed, peanut, corn, cod liver, lard, tallow, menhaden, sulphonated oils for textiles, oils for soaps, etc., whether crude, refined, or partially refined, hydrogenated, or otherwise treated.

Although it is preferable to use the milk-solids-not-fat referred to above, there may also be utilized combinations of substantially refined milk products which at the elevated temperatures referred to will show substantial stabilizing activity. For example, combinations of milk protein such as casein and milk sugar such as lactose, or of milk sugar and milk phospholipin, such as separator residue, or mixtures of those combinations may be used and the amount of each may vary within a wide range such as from 1 part of one to 10 parts of another, etc.

*Example V*

Soya bean oil was prepared—
A. Untreated.
B. By heating to 375° F. for 5 seconds with 0.3% of a mixture comprising 50% lactose and 50% casein.

The oils were tested at 98° F.

|  | Rancid after— |
|---|---|
| Soya bean oil A | 21 hours |
| Soya bean oil B | 140 hours |

Where milk protein is not available, other proteins such as egg albumen may be substituted and where lactose is not available, sucrose or dextrose may be substituted. It is preferable, however, to utilize the milk solids in their naturally available form.

The milk solids may also be fortified and their stabilizing activity materially increased by the addition thereto before being heated in the oil requiring stabilization of small quantities of materials such as lecithin, organic acids such as tartaric, citric, lactic, succinic, etc., crude, unrefined and raw sugars, etc., the water or alcoholic extracts of the cereals or deoiled or low-oil containing seeds. These materials still further enhance the stabilizing activity of the milk solids.

The extracts of milk solids may also be employed as obtained preferably by the use of solvents which would not remove any substantial amount of glycerides contained in the milk such as the alcohol soluble extract of powdered skim milk, made using an OH aliphatic solvent of low molecular weight, having the formula XOH where X is hydrogen or a low molecular weight aliphatic grouping.

Where the oils are to be held for relatively long periods, and where treatments as high as 325° F. to 400° F. are undesirable, up to 5% of the milk solids may be added to the oils, heating them to at least 160° F. and preferably to 220° F., and some stabilizing action will be obtained. The stabilizing activity thus obtained will however in no sense be comparable to that obtained when using the high heat treatment previously described.

The increased stability of oils produced at high temperatures is particularly not to be expected since when the heat treatment is conducted in air, the oils are rendered substantially unstable and their normal stability is materially reduced. Exactly the opposite occurrence takes place when the milk solids are heated in the oil at the elevated temperatures described.

This application is a continuation in part of copending application Serial No. 191,824, filed February 21, 1938.

Having described my invention, what I claim is:

1. A method of stabilizing a refined glyceride oil against oxidative deterioration which consists in mixing with and thoroughly dispersing in the oil a relatively small amount of dried and finely divided milk-solids-not-fat and then heating the oil to a sufficiently high temperature to char the added material.

2. A method of stabilizing a refined glyceride oil against oxidative deterioration which consists in mixing with and thoroughly dispersing in the oil a relatively small amount of dried and finely divided milk-solids-not-fat and then heating the oil to a sufficiently high temperature to char the added material, said heating being conducted at a temperature in excess of about 250° F.

3. A stabilized glyceride oil which is highly resistant to oxidative deterioration, said oil consisting of the reaction product with the oil of a relatively small amount of dried and finely divided milk-solids-not-fat thoroughly dispersed therethrough, said reaction product being produced by heating the milk solids in the oil at a temperature sufficiently high to char the milk solids.

4. A stabilized glyceride oil which is highly resistant to oxidative deterioration, said oil consisting of the reaction product with the oil of a relatively small amount of dehydrated and finely divided milk-solids-not-fat thoroughly dispersed therethrough, said reaction product being produced by heating the milk solids in the oil at a temperature sufficiently high to char the milk solids, said temperature being in excess of about 250° F.

5. A process of stabilizing a refined cottonseed oil against oxidative deterioration which consists in adding to said cottonseed oil and thoroughly dispersing in said cottonseed oil about 0.5% of dried and powdered skim milk while said oil is maintained at a temperature of about 400° F., permitting the dried skim milk to char in said cottonseed oil and then filtering to remove the charred residue of the powdered skim milk, whereby there is produced a cottonseed oil highly resistant to oxidative deterioration and to the development of rancidity.

6. A refined cottonseed oil highly resistant to oxidative deterioration, said oil having been heated at about 400° F. with about 0.5% of dried and powdered skim milk for a sufficient length of time to char said powdered skim milk.

7. A process of stabilizing a glyceride oil to render such oil highly resistant to oxidative deterioration which consists in mixing with and thoroughly dispersing in the oil about 1% of a dehydrated powdered buttermilk, heating up to 400° F. and then cooling, whereby there is produced an oil highly resistant to the development of oxidative deterioration.

8. A stabilized glyceride oil which has been heated up to about 400° F. with about 1% of powdered buttermilk thoroughly dispersed therein.

9. A stabilized glyceride oil which has been heated up to above 250° F. with between 0.01% and 3.0% of dried milk-solids-not-fat thoroughly dispersed therein.

SIDNEY MUSHER.